US011289920B2

United States Patent
Krieg et al.

(10) Patent No.: US 11,289,920 B2
(45) Date of Patent: Mar. 29, 2022

(54) CIRCUIT AND CHARGING METHOD FOR AN ELECTRICAL ENERGY STORAGE SYSTEM

(71) Applicant: Robert Bosch GmbH, Stuttgart (DE)

(72) Inventors: Berengar Krieg, Gerlingen (DE); Marco Friedrich, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 16/606,554

(22) PCT Filed: Apr. 11, 2018

(86) PCT No.: PCT/EP2018/059215
§ 371 (c)(1),
(2) Date: Oct. 18, 2019

(87) PCT Pub. No.: WO2018/197206
PCT Pub. Date: Nov. 1, 2018

(65) Prior Publication Data
US 2020/0055412 A1    Feb. 20, 2020

(30) Foreign Application Priority Data
Apr. 24, 2017  (DE) .............. 102017206834

(51) Int. Cl.
*H02J 7/00* (2006.01)
*B60L 53/20* (2019.01)
(Continued)

(52) U.S. Cl.
CPC ............ *H02J 7/0024* (2013.01); *B60L 53/14* (2019.02); *B60L 53/20* (2019.02); *B60L 58/19* (2019.02); *H02J 7/007* (2013.01); *H02J 7/0014* (2013.01)

(58) Field of Classification Search
CPC .................................................... H02J 7/0024
(Continued)

(56) References Cited

U.S. PATENT DOCUMENTS

| 8,288,992 | B2 * | 10/2012 | Kramer ................. H02J 7/0016 320/119 |
| 2007/0052295 | A1 | 3/2007 | Frucht | |
| 2009/0079384 | A1 * | 3/2009 | Harris ................... H02J 7/0024 320/102 |

FOREIGN PATENT DOCUMENTS

| DE | 10330834 | 2/2005 |
| DE | 102011089648 | 6/2013 |

(Continued)

OTHER PUBLICATIONS

International Search Report for Application No. PCT/EP2018/0559215 dated Jul. 11, 2018 (English Translation, 3 pages).

*Primary Examiner* — Eric D Lee
(74) *Attorney, Agent, or Firm* — Michael Best & Friedrich LLP

(57) ABSTRACT

The invention relates to a circuit for an electrical energy storage system (100) with two energy storage units (R1, R2) respectively comprising a first and a second pole connection (P1, P4, P3, P2), said circuit comprising: at least one first and one second input (E1, E2), at least one first and one second output (A1, A2), a first switching element (S1) between the first pole connection (P1) of the first energy storage unit (R1) and the first output (A1), and a second switching element (S2) between the second pole connection (P2) of the second energy storage unit (R2) and the second output (A2), a third switching element (S3) being arranged between the second pole connection (P3) of the first energy storage unit (R1) and the first pole connection (P4) of the second energy storage unit (R2), a fourth switching element (S4) being arranged between the second pole connection (Continued)

(P3) of the first energy storage unit (R1) and the second pole connection (P2) of the second energy storage unit (R2), and a fifth switching element (S5) being arranged between the first pole connection (P1) of the first energy storage unit (R1) and the first pole connection (P4) of the second energy storage unit (R2), the energy storage units (R1, R2) being connected in parallel or in series according to the switch position of the third, fourth and fifth switching elements (S3, S4, S5).

11 Claims, 5 Drawing Sheets

(51) Int. Cl.
*B60L 58/19* (2019.01)
*B60L 53/14* (2019.01)

(58) Field of Classification Search
USPC .......................................................... 320/117
See application file for complete search history.

(56) References Cited

FOREIGN PATENT DOCUMENTS

| | | |
|---|---|---|
| DE | 102012219488 | 4/2014 |
| DE | 102014004790 | 10/2015 |
| DE | 102016008052 | 2/2017 |
| EP | 2810815 | 12/2014 |
| WO | 2011105794 | 9/2011 |

\* cited by examiner

CIRCUIT AND CHARGING METHOD FOR AN ELECTRICAL ENERGY STORAGE SYSTEM

BACKGROUND OF THE INVENTION

The present invention relates to a circuit arrangement and a charging method for an electrical energy storage system.

In electrically driven vehicles, in particular electric vehicles (EV) or hybrid vehicles (HEV), today, battery modules are constructed by means of parallel and series connection of single battery cells that outwardly act as a battery pack in the vehicle. The battery pack has a rated voltage that defines the voltage range for charging and discharge processes depending on the state of charge and loading of the battery pack.

The charging of electrically driven vehicles, in particular of vehicles having a battery as the main energy source, is the subject of intensive research and development today. Firstly, the reason for this is that present charging times for a complete battery charge are still very long, and, secondly, the capacity of future stores is more likely to increase further, which means that electrical energy storage systems installed in the vehicle that have capacities of more than 50 kWh will be used in the near future. At the same time, for wider acceptance of these vehicles, shorter charging times, preferably comparable with the times spent waiting for the refueling process for vehicles with an internal combustion engine, are desirable.

Owing to technical standards, available parts and technologies and also efficiency demands, a normal operating voltage for the vehicle drive train is currently limited to values of typically from 300 V to 450 V in the case of purely electrically driven vehicles. Standard-compliant charging plugs are typically certified for rated currents up to 200 A, the charging voltage for DC charging typically being able to be between 200 V and 850 V. Communication between energy storage system and charging device allows smooth variation of charging voltage and charging current to be effected, within certain limits, by the charging device.

Electrical energy storage systems, in particular battery systems, available today provide no opportunity to adjust the voltage when charging, however, since their interconnection, for example connection in series or in parallel, is hardwired, and at the same time to continue to operate the components present on the drive side, for example the inverter, at the normal operating voltage level.

An example of a circuit arrangement in accordance with the prior art is shown by FIG. 1: a DC charging device is electrically conductively connected to a battery system in a manner disconnectable by means of switching elements. The battery system and at least one load have further switching elements arranged between them, so that the battery system is electrically conductively connectable to the load by means of the further switching elements. When the load is not in use, the battery system and the load are electrically disconnectable by means of the further switching elements.

A further example of a circuit arrangement in accordance with the prior art is shown by FIG. 2: adjustment of the charging voltage by the DC charging device is rendered possible by means of a voltage transformer between the DC charging device and the battery system. Said voltage transformer is arranged in an electrically driven vehicle powered by the battery system.

DE 103 30 834 A1 shows a method and an apparatus for supplying power to at least one load in the event of mains failure.

WO 2011/105794 discloses a hybrid cell system having a series circuit, the secondary cells of which can be connected either in series or in parallel.

DE 10 2012 219 488 A1 shows a circuit arrangement and a method for precharging a capacitive component.

SUMMARY OF THE INVENTION

The invention sets out from a circuit arrangement for an electrical energy storage system having a first energy storage unit and a second energy storage unit, which each have a first pole connection and a second pole connection, having:
  at least one first input and a second input for electrically conductive connection to a DC voltage source,
  at least one first output and a second output for electrically conductive connection to at least one electrical component,
  a first switching element, which is arranged between the first pole connection of the first energy storage unit and the first output, wherein the first pole connection of the first energy storage unit is electrically conductively connected to a first connection of the first switching element, and the first output is electrically conductively connected to a second connection of the first switching element,
  a second switching element, which is arranged between the second pole connection of the second energy storage unit and the second output, wherein the second pole connection of the second energy storage unit is electrically conductively connected to a first connection of the second switching element, and the second output is electrically conductively connected to a second connection of the second switching element,
  wherein the first pole connection of the first energy storage unit is electrically conductively connectable to the first input by means of a seventh switching element, and the second pole connection of the second energy storage unit is electrically conductively connectable to the second input by means of a further seventh switching element.

The essence of the invention is that the second pole connection of the first energy storage unit and the first pole connection of the second energy storage unit have a third switching element arranged between them, wherein the second pole connection of the first energy storage unit is electrically conductively connected to a first connection of the third switching element, and the first pole connection of the second energy storage unit is electrically conductively connected to a second connection of the third switching element, wherein the second pole connection of the first energy storage unit and the second pole connection of the second energy storage unit have a fourth switching element arranged between them, wherein the second pole connection of the first energy storage unit is electrically conductively connected to a first connection of the fourth switching element, and the second pole connection of the second energy storage unit is electrically conductively connected to a second connection of the fourth switching element, wherein the first pole connection of the first energy storage unit and the first pole connection of the second energy storage unit have a fifth switching element arranged between them, wherein the first pole connection of the first energy storage unit is electrically conductively connected to a first connection of the fifth switching element, and the first pole connection of the second energy storage unit is electrically conductively connected to a second connection of the fifth switching element, wherein the energy storage units are connected in parallel or in series on the basis of the switch position of the third, fourth and fifth switching elements.

The background of the invention is to be able to charge the energy store by means of different charging apparatuses each having different charging properties by virtue of the interconnection of the energy store being adjusted, so that the charging properties of the charging apparatus and the charging properties of the energy store are compatible.

Advantageously, the two energy storage units are of the same design. Therefore, the maximum charging voltage of the energy storage system is twice as great in a series connection as in the parallel connection.

Preferably, the third switching element is closed when no current is flowing. Thus, if there is no control voltage applied to the third switching element, then it is closed.

Preferably, the fourth and/or fifth switching elements are open when no current is flowing. Thus, if there is no control voltage applied to the fourth and/or fifth switching element, then it is open.

Further advantageous embodiments of the present invention are the subject of the subclaims.

In accordance with one advantageous refinement, the circuit arrangement has at least one precharging circuit configured to limit equalizing currents between the first energy storage unit and the second energy storage unit. It is advantageous in this case that the two energy storage units can be converted to the parallel connection even when the state of charge is very different. To this end, the energy storage unit having the lower state of charge is first of all charged by means of the precharging circuit, and the energy storage units are connected in parallel only when the states of charge of the energy storage units are aligned with one another. Therefore, in the case of energy storage cells having increased self-discharge, only the energy storage unit that has the energy storage cells having increased self-discharge needs to be precharged.

Advantageously, the precharging circuit is arranged so as to be connected in parallel with the fourth switching element and/or the fifth switching element.

In accordance with a further advantageous refinement, the circuit arrangement has a DC-DC voltage converter and a sixth switching element, wherein a first input connection of the DC-DC voltage converter is electrically conductively connected to the second pole connection of the first energy storage unit, wherein a second input connection of the DC-DC voltage converter is electrically conductively connected to the first pole connection of the second energy storage unit, wherein the sixth switching element is arranged between a first output connection of the DC-DC voltage converter and the first output, wherein a first connection of the sixth switching element is electrically conductively connected to the first output connection of the DC-DC voltage converter, and a second connection of the sixth switching element is electrically conductively connected to the first output, wherein a second output connection of the DC-DC voltage converter is electrically conductively connected to the first connection of the second switching element. It is advantageous in this case that when the energy storage units are connected in parallel and the rated voltage of the energy storage system is therefore reduced, a voltage consistent with the rated voltage when the energy storage units are connected in series is producible by means of the DC-DC voltage converter. Further electrical components are therefore operable by means of the DC-DC voltage converter during a charging process of the energy storage system.

It is furthermore advantageous if the first and second input connections of the DC-DC voltage converter are arranged so as to be connected in antiparallel with the third switching element. As a result, the DC-DC voltage converter is shorted and hence de-energized when the third switching element is closed, in particular when the energy storage units are connected in series.

The essence of the invention for the charging method for an electrical energy storage system, having at least two energy storage units and a circuit arrangement as described above or as claimed in one of the claims directed at the circuit arrangement, by means of a DC voltage source is that the charging method has the temporally successive method steps:

wherein a first method step involves at least one property of the DC voltage source being ascertained;

wherein a second method step involves at least one property of the energy storage system being ascertained;

wherein a third method step involves the at least one property of the DC voltage source being compared with the at least one property of the energy storage system;

wherein a fourth method step involves the result of the third method step being used to stipulate whether the energy storage units are charged in a manner connected in parallel in a first variant or in a manner connected in series in a second variant;

wherein a fifth method step involves a third switching element being closed and a fourth switching element and a fifth switching element being opened in the first variant in order to connect the energy storage units in series;

wherein in the second variant, in order to connect the energy storage units in parallel, the third switching element is opened, the fourth switching element is subsequently closed and the respective state of charge of storage cells of the respective energy storage unit is equalized within the respective energy storage unit and then the fifth switching element is closed;

wherein a sixth method step involves two seventh switching elements being closed in order to connect a first pole connection of the first energy storage unit to a first input of the circuit arrangement and to connect a second pole connection of the second energy storage unit to a second input of the circuit arrangement, and, subsequently, the supply of energy from the DC voltage source connected to the first pole connection and the second pole connection to the energy storage units being started;

wherein a seventh method step involves the states of charge of the energy storage units being monitored;

wherein an eighth method step involves the charging process being terminated by opening the two seventh switching elements and if need be closing the third switching element and opening the fourth and fifth switching elements, so that the energy storage units are connected in series.

The background of the invention is to use the charging method to charge the energy store by means of different DC voltage sources each having different charging properties by virtue of the interconnection of the energy store being adjusted, so that the charging properties of the DC voltage source and the charging properties of the energy store are compatible.

Advantageously, the states of charge of the energy storage cells of the respective energy storage unit are aligned in the fifth method step by means of an energy storage management system of the energy storage system.

In accordance with one advantageous refinement, the first method step involves the maximum charging voltage of the DC voltage source being determined, wherein the second method step involves the maximum charging voltage of the energy storage system being determined, wherein the fourth method step involves the first variant, a parallel connection, being chosen if the maximum charging voltage of the energy storage system exceeds the maximum charging voltage of the DC voltage source. It is advantageous in this case that the charging voltage of the energy storage system is adjustable to the charging voltage of the DC voltage source by means of the adjustment of the interconnection of the energy storage units.

In accordance with a further advantageous embodiment, the fifth method step is followed by a sixth switching element being closed and, in the sixth method step, the first switching element remaining open in order to connect a DC-DC voltage converter to the DC voltage source. As a result, when the energy storage units are connected in parallel and the rated voltage of the energy storage system is therefore reduced, a voltage consistent with the rated voltage when the energy storage units are connected in series is producible by means of the DC-DC voltage converter. Further electrical components are therefore operable by means of the DC-DC voltage converter during a charging process of the energy storage system.

The essence of the invention for the electrical energy storage system having at least two electrical energy storage units is that the electrical energy storage system has a circuit arrangement as described above or as claimed in one of the claims directed at the circuit arrangement.

The essence of the invention for the use of a circuit arrangement as described above or as claimed in one of the claims directed at the circuit arrangement is that the circuit arrangement is used in an electrically driven vehicle or in a hybrid vehicle.

The background of the invention is that the vehicle can be charged by means of different DC voltage sources. The availability of charging stations for the vehicle is therefore improved.

The switching elements can be embodied for example as semiconductor switching elements, for example as MOSFETs or IGBTs, or else as electromechanical relays or contactors.

An electrical energy storage unit can be understood to mean in particular an electrochemical battery cell and/or a battery module having at least one electrochemical battery cell and/or a battery pack having at least one battery module. For example, the electrical energy storage unit can be a lithium battery cell or a lithium battery module or a lithium battery pack. In particular, the electrical energy storage unit can be a lithium ion battery cell or a lithium ion battery module or a lithium ion battery pack. Furthermore, the battery cell can be of lithium polymer storage battery, nickel metal hydride storage battery, lead acid storage battery, lithium air storage battery or lithium sulfur storage battery type or, quite generally, a storage battery of any electrochemical composition.

DETAILED DESCRIPTION

Figure 1:
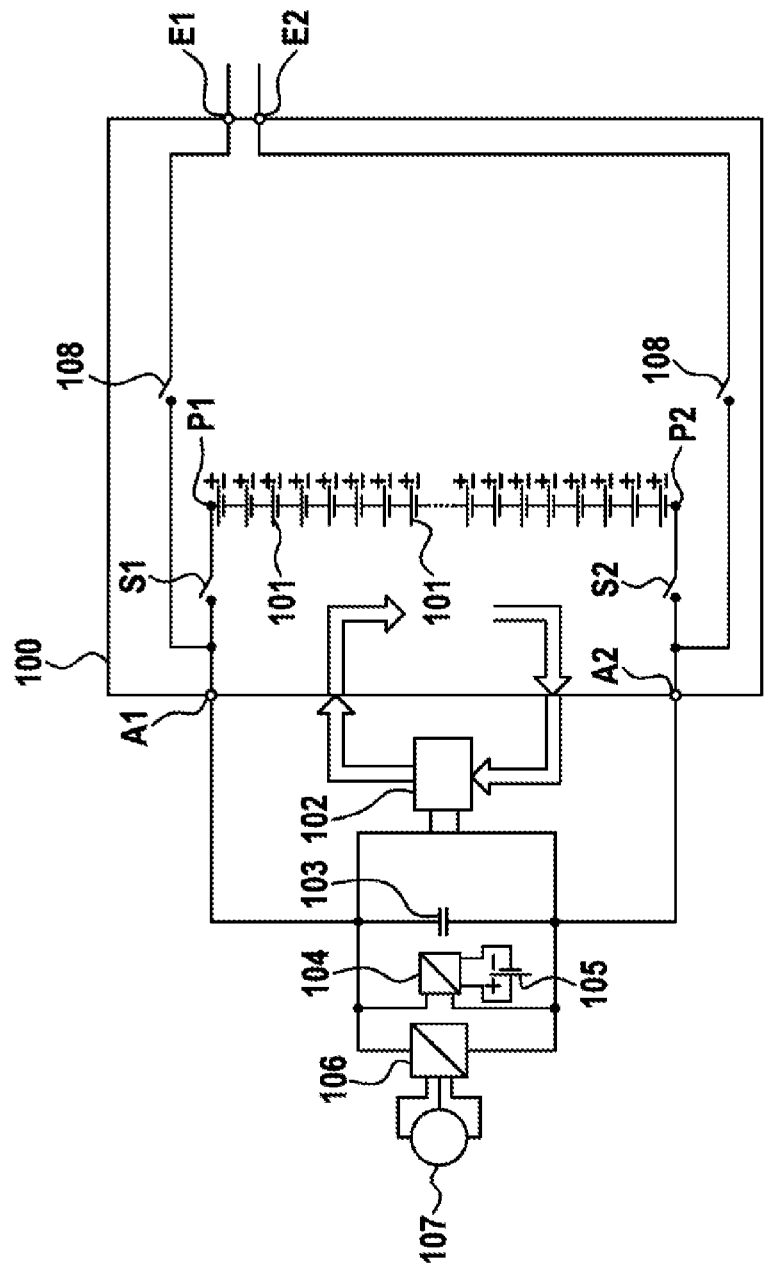
FIG. 1 shows a circuit arrangement for an electrical energy storage system in accordance with the prior art.
Figure 2:
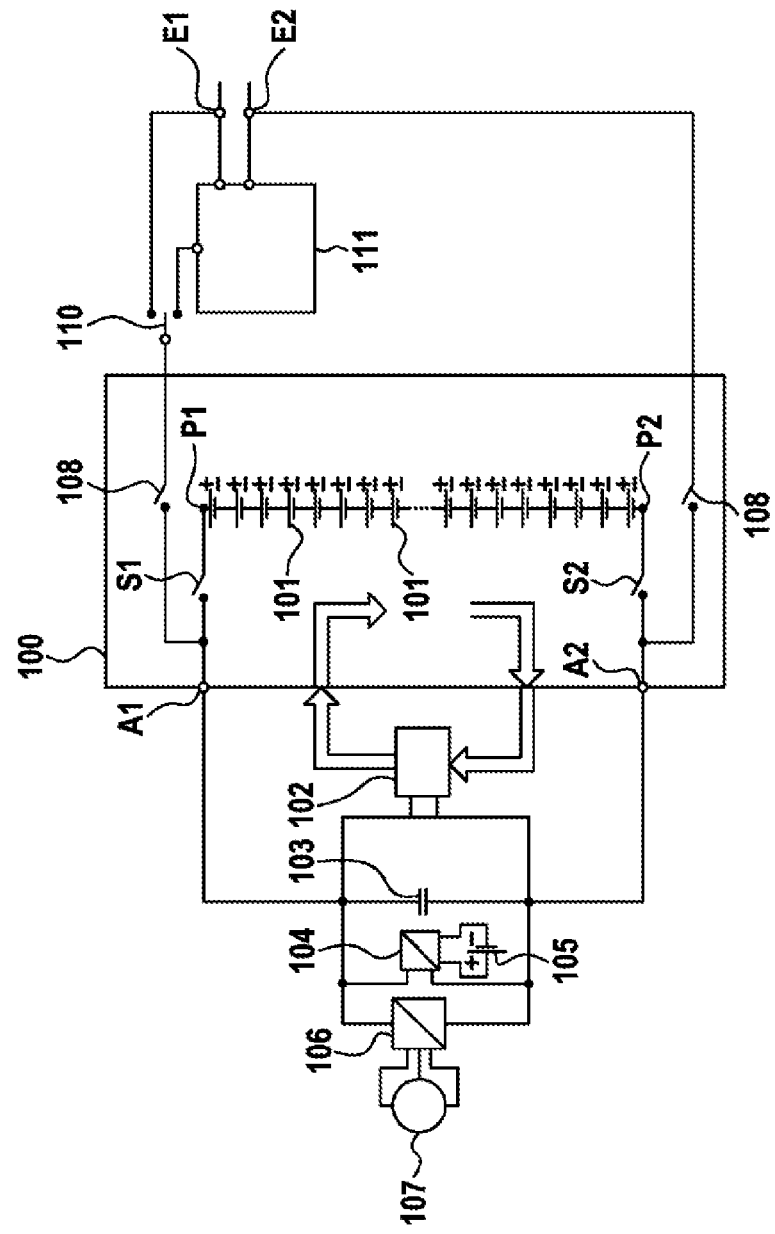
FIG. 2 shows a further circuit arrangement for an electrical energy storage system in accordance with the prior art.

The section that follows explains the invention on the basis of exemplary embodiments, from which further inventive features can arise, the scope of the invention not being restricted to said features, however. The exemplary embodiments are depicted in the drawings.

Identical reference signs denote identical apparatus components and method steps in all figures.

Figure 3:
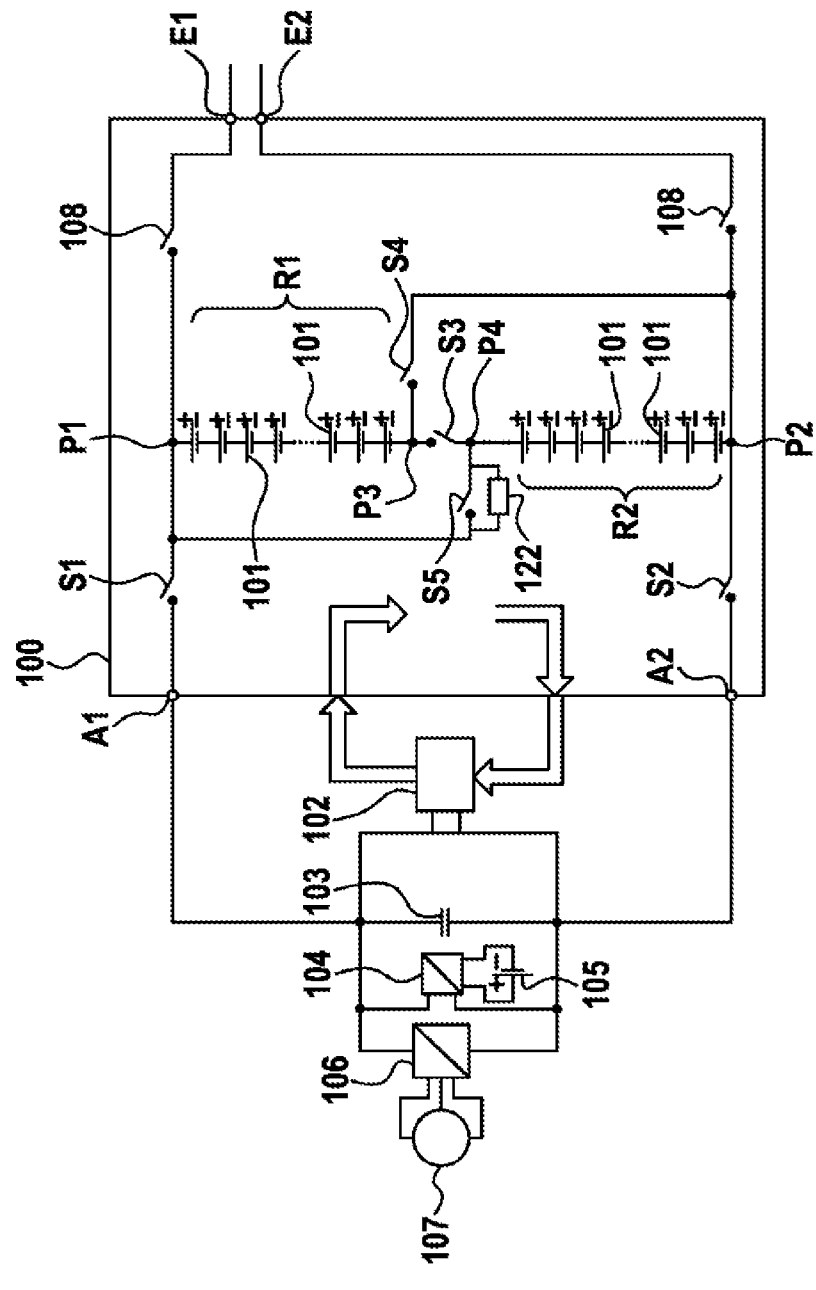
FIG. 3 shows a circuit arrangement according to the invention for an electrical energy storage system in accordance with a first embodiment.

FIG. 3 depicts a first embodiment of the circuit arrangement according to the invention for an energy storage system 100.

The energy storage system 100 has a first energy storage unit R1 and a second energy storage unit R2, which each have at least two energy storage cells 101 connected in series. The respective energy storage unit (R1, R2) can also have a combination of energy storage cells 101 connected in series and connected in parallel or a parallel connection of energy storage cells 101.

Each energy storage unit (R1, R2) has a first, in particular positive, pole connection (P1, P4) and a second, in particular negative, pole connection (P3, P2) in each case.

The energy storage system 100 is electrically conductively connectable to a DC voltage source, not depicted in the figures, by means of a first input E1 and a second input E2. The first input E1 and the first pole connection P1 of the first energy storage unit R1 have a seventh switching element 108 arranged between them. The second input E2 and the second pole connection P2 of the second energy storage unit R2 have a further seventh switching element 108 arranged between them. The respective seventh switching element 108 renders the respective pole connection (P1, P2) and the respective input (E1, E2) electrically conductively connectable to one another for the purpose of charging the energy storage system 100.

The energy storage units (R1, R2) are connectable in series by means of a third switching element (S3). To this end, the third switching element (S3) is arranged between the second pole connection P3 of the first energy storage unit R1 and the first pole connection E4 of the second energy storage unit R2. As a result, the second pole connection of the first energy storage unit P3 and the first pole connection P4 of the second energy storage unit R2 are electrically conductively connectable.

To connect the energy storage units (R1, R2) in parallel, the circuit arrangement has a fourth switching element S4 and a fifth switching element S5. The fourth switching element S4 renders the first pole connection P1 of the first energy storage unit R1 connectable to the first pole connection P4 of the second energy storage unit R2. The fifth switching element S5 renders the second pole connection P3 of the first energy storage unit R1 connectable to the second pole connection P2 of the second energy storage unit R2.

The first pole connection P1 of the first energy storage unit R1 is electrically conductively connectable to a first output A1 of the energy storage system 100 by means of a first switching element S1. The second pole connection P2 of the second energy storage unit R2 is electrically conductively connectable to a second output A2 of the energy storage system 100 by means of a second switching element S2.

The circuit arrangement has at least one precharging circuit 122, which is arranged so as to be connected in parallel with the fifth switching element S5. Alternatively or additionally, a further precharging circuit, not depicted, is arranged so as to be connected in parallel with the fourth switching element S4.

To charge the energy storage units (R1, R2) connected in parallel, the third switching element S3 is open and the fourth and fifth switching elements (S4, S5) and the seventh switching elements S7 are closed. In order to be able to supply energy, during the charging process, to loads that are each electrically conductively connected to the outputs (A1, A2) of the battery system, the first and second switching elements (S1, S2) can be closed. However, these components are then operated at only half of the normal operating voltage.

To charge the energy storage units (R1, R2) connected in series, the third switching element S3 and the seventh switching elements S7 are closed and the fourth and fifth switching elements (S4, S5) are open. In order to be able to supply energy, during the charging process, to loads that are each electrically conductively connected to the outputs (A1, A2) of the battery system, the first and second switching elements (S1, S2) can be closed.

In this case, when making the series connection, care should be taken to ensure that the fourth switching element S4 and the fifth switching element S5 are opened first before the third switching element S3 is closed, in order to avoid a short. This can take place in the case of mechanical switching devices, for example contactors, as a result of joint mechanical coupling of the fourth switching element S4, the fifth switching element S5 and the third switching element S3, with the closing of the third switching element S3 lagging accordingly, or in the case of electronic switching devices, for example MOSFETs or IGBTs, and also in the case of noncoupled electromechanical switching devices as a result of applicable veto circuitry for the actuation or as a result of applicably safeguarded software functions in an electronic unit, not depicted in this case, controlling the switching device.

The circuit arrangement according to the invention for an energy storage system 100 is usable for an electric motor of a vehicle, for example. To this end, the outputs (A1, A2) of the energy storage system 100 are connected to a DC-link capacitor 103. The DC-link capacitor 103 feeds a converter 106 that produces an AC voltage for the electric motor.

A further DC-DC voltage converter 104 is arrangeable so as to be connected in parallel with the DC-link capacitor 103, said DC-DC voltage converter producing a low voltage, in particular 12 V or 48 V, for a vehicle electrical system 105 by means of which further electrical components of the vehicle are operable.

A cooling apparatus 102 for the energy storage system 100, which cooling apparatus is arranged so as to be connected in parallel with the DC-link capacitor 103, is feedable from the DC-link capacitor 103.

The described use of a circuit arrangement for an energy storage system 100 is also possible in power engineering, for example in wind power engineering or solar power engineering or hydroelectric power engineering.

Figure 4:
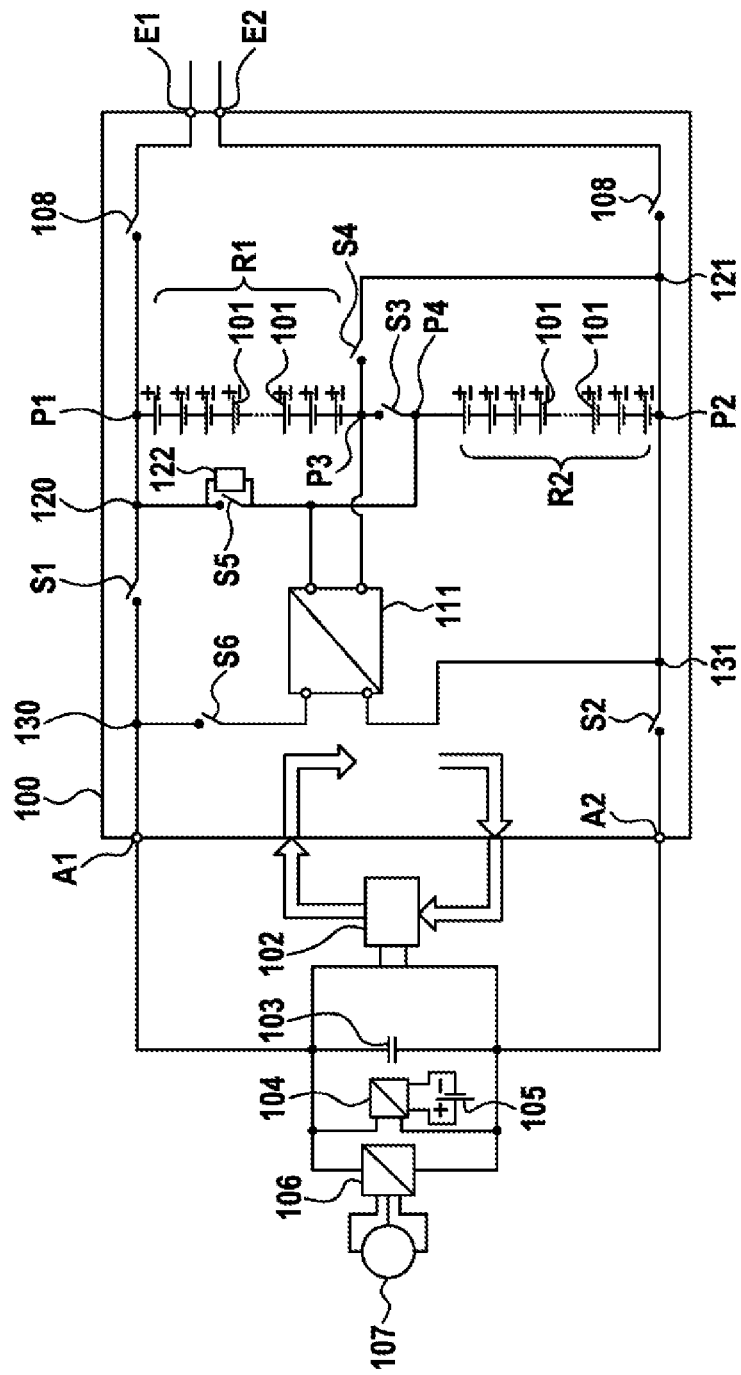
FIG. 4 shows a circuit arrangement according to the invention for an electrical energy storage system in accordance with a second embodiment.

FIG. 4 depicts a second embodiment of the circuit arrangement according to the invention.

In addition to the first embodiment shown in FIG. 3, the second embodiment shown in FIG. 4 has a DC-DC voltage converter 111 and a sixth switching element S6.

The DC-DC voltage converter 111 is usable for example for supplying power to the cooling apparatus 102 and/or to a further electrical component, in particular a vehicle component, during the charging process when the energy storage units are connected in parallel.

The DC-DC voltage converter 111 has a first input connection electrically conductively connected to the second pole connection P3 of the first energy storage unit R1 and has a second input connection electrically conductively connected to the first pole connection P4 of the second energy storage unit R2. The sixth switching element S6 is arranged between a first output connection of the DC-DC voltage converter 111 and the first output A1. A second output connection of the DC-DC voltage converter 111 is electrically conductively connected to the second switching element S2, the second switching element S2 being arranged between the second output connection and the second output A2.

The input connections of the DC-DC voltage converter 111 are arranged so as to be connected in antiparallel with the third switching element S3.

To use the DC-DC voltage converter 111 when the energy storage units are connected in parallel, the first and third switching elements (S1, S3) are opened and the second, fourth, fifth and sixth switching elements (S2, S4, S5, S6) and the seventh switching elements S7 are closed.

Figure 5:
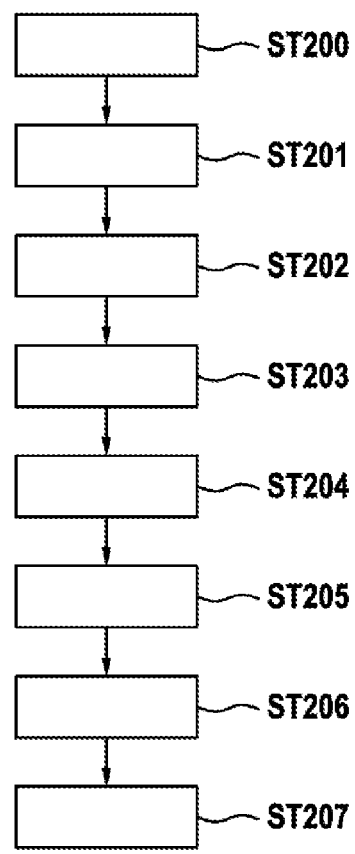
FIG. 5 shows a flowchart for a charging method according to the invention for an electrical energy storage system.

FIG. 5 shows a flowchart for a charging method according to the invention for an electrical energy storage system 100, having at least two energy storage units (R1, R2) and a circuit arrangement in accordance with one exemplary embodiment by means of a DC voltage source. The output position of all the switching elements (S1, S2, S3, S4, S5, S6, S7) for the exemplary description below is that all the switching elements (S1, S2, S3, S4, S5, S6, S7) are open in this case.

The charging method has the following temporally successive method steps:

A first method step ST200 involves at least one property of the DC voltage source, in particular the maximum charging voltage of the DC voltage source, being ascertained.

A second method step ST201 involves at least one property of the energy storage system 100, in particular the maximum charging voltage of the energy storage system 100, being ascertained.

A third method step ST202 involves the at least one property of the DC voltage source being compared with the at least one property of the energy storage system 100.

A fourth method step ST203 involves the result of the third method step ST202 being used to stipulate whether the energy storage units (R1, R2) are charged in a manner connected in parallel in a first variant or in a manner connected in series in a second variant, in particular wherein the first variant, a parallel connection, is chosen if the maximum charging voltage of the energy storage system 100 exceeds the maximum charging voltage of the DC voltage source.

A fifth method step ST204 involves a third switching element S3 being closed and a fourth switching element S4 and a fifth switching element S5 being opened in the first variant in order to connect the energy storage units (R1, R2) in series.

In the second variant, to connect the energy storage units (R1, R2) in parallel, the third switching element S3 is opened in the fifth method step ST204, the fourth switching element S4 is subsequently closed and the respective state of charge of storage cells 101 of the respective energy storage unit (R1, R2) is equalized by means of the precharging circuit 122 within the respective energy storage unit (R1, R2) and then the fifth switching element S5 is closed.

A sixth method step ST205 involves two seventh switching elements 108 being closed in order to connect a first pole connection P1 of the first energy storage unit R1 to a first input E1 of the circuit arrangement and to connect a second pole connection P2 of the second energy storage unit R2 to a second input E2 of the circuit arrangement. Subsequently, the supply of energy from the DC voltage source connected to the first pole connection P1 and the second pole connection P2 to the energy storage units (R1, R2) is started.

A seventh method step ST206 involves the states of charge of the energy storage units (R1, R2) being monitored.

As soon as the desired state of charge of the energy storage units (R1, R2) has been reached, an eighth method step ST207 involves the charging process being terminated by opening the two seventh switching elements 108 and if need be closing the third switching element S3 and opening the fourth and fifth switching elements (S4, S5), so that the energy storage units (R1, R2) are connected in series.

An alternative charging process involves the fifth method step being followed by a sixth switching element S6 being closed and, in the sixth method step, the first switching element S1 remaining open, in order to connect a DC-DC voltage converter 111 to the DC voltage source.

The invention claimed is:

1. A circuit arrangement for an electrical energy storage system (100) having a first energy storage unit (R1) and a second energy storage unit (R2), which each have a first pole connection (P1, P4) and a second pole connection (P3, P2), the circuit arrangement comprising:
    at least one first input (E1) and a second input (E2) for electrically conductive connection to a DC voltage source,
    at least one first output (A1) and a second output (A2) for electrically conductive connection to at least one electrical component,
    a first switching element (S1), which is arranged between the first pole connection (P1) of the first energy storage unit (R1) and the first output (A1), wherein the first pole connection (P1) of the first energy storage unit (R1) is electrically conductively connected to a first connection of the first switching element (S1), and the first output (A1) is electrically conductively connected to a second connection of the first switching element (S1),
    a second switching element (S2), which is arranged between the second pole connection (P2) of the second energy storage unit (R2) and the second output (A2), wherein the second pole connection (P2) of the second energy storage unit (R2) is electrically conductively connected to a first connection of the second switching element (S2), and the second output (A2) is electrically conductively connected to a second connection of the second switching element (S2),
    wherein the first pole connection (P1) of the first energy storage unit (R1) is electrically conductively connectable to the first input (E1) by means of a seventh switching element (108), and the second pole connection (P2) of the second energy storage unit (R2) is electrically conductively connectable to the second input (E2) by means of a further seventh switching element (108),
    wherein the second pole connection (P3) of the first energy storage unit (R1) and the first pole connection (P4) of the second energy storage unit (R2) have a third switching element (S3) arranged between them, wherein the second pole connection (P3) of the first energy storage unit (R1) is electrically conductively connected to a first connection of the third switching element (S3), and the first pole connection (P4) of the second energy storage unit (R2) is electrically conductively connected to a second connection of the third switching element (S3),
    wherein the second pole connection (P3) of the first energy storage unit (R1) and the second pole connection (P2) of the second energy storage unit (R2) have a fourth switching element (S4) arranged between them, wherein the second pole connection (P3) of the first energy storage unit (R1) is electrically conductively connected to a first connection of the fourth switching element (S4), and the second pole connection (P2) of the second energy storage unit (R2) is electrically conductively connected to a second connection of the fourth switching element (S4),
    wherein the first pole connection (P1) of the first energy storage unit (R1) and the first pole connection (P4) of the second energy storage unit (R2) have a fifth switching element (S5) arranged between them, wherein the first pole connection (P1) of the first energy storage unit (R1) is electrically conductively connected to a first connection of the fifth switching element (S5), and the first pole connection (P4) of the second energy storage unit (R2) is electrically conductively connected to a second connection of the fifth switching element (S5),
    wherein the energy storage units (R1, R2) are connected in parallel or in series on the basis of the switch position of the third, fourth and fifth switching elements (S3, S4, S5),
    wherein the circuit includes at least one precharging circuit (122) configured to limit equalizing currents between the first energy storage unit (R1) and the second energy storage unit (R2),
    wherein the at least one precharging circuit (122) is arranged so as to be connected in parallel with the fifth switching element (S5).

2. The circuit arrangement as claimed in claim 1, wherein the circuit arrangement has a DC-DC voltage converter (111) and a sixth switching element (S6),
    wherein a first input connection of the DC-DC voltage converter (111) is electrically conductively connected to the second pole connection (P3) of the first energy storage unit (R1),
    wherein a second input connection of the DC-DC voltage converter (111) is electrically conductively connected to the first pole connection (P4) of the second energy storage unit (R2),
    wherein the sixth switching element (S6) is arranged between a first output connection of the DC-DC voltage converter (111) and the first output (A1), wherein a first connection of the sixth switching element (S6) is electrically conductively connected to the first output connection of the DC-DC voltage converter (111), and a second connection of the sixth switching element (S6) is electrically conductively connected to the first output (A1), wherein a second output connection of the DC-DC voltage converter (111) is electrically conductively connected to the first connection of the second switching element (S2).

3. The circuit arrangement as claimed in claim 2, wherein the first and second input connections of the DC-DC voltage converter (111) are arranged so as to be connected in antiparallel with the third switching element (S3).

4. A charging method for an electrical energy storage system (100), having at least two energy storage units (R1, R2) and a circuit arrangement as claimed in claim 1, by means of a DC voltage source,
wherein the charging method has the temporally successive method steps:
wherein a first method step (ST200) involves at least one property of the DC voltage source being ascertained;
wherein a second method step (ST201) involves at least one property of the energy storage system (100) being ascertained;
wherein a third method step (ST202) involves the at least one property of the DC voltage source being compared with the at least one property of the energy storage system (100);
wherein a fourth method step (ST203) involves the result of the third method step (ST202) being used to stipulate whether the energy storage units (R1, R2) are charged in a manner connected in parallel in a first variant or in a manner connected in series in a second variant;
wherein a fifth method step (ST204) involves a third switching element (S3) being closed and a fourth switching element (S4) and a fifth switching element (S5) being opened in the first variant in order to connect the energy storage units (R1, R2) in series;
wherein in the second variant, to connect the energy storage units (R1, R2) in parallel, the third switching element (S3) is opened, the fourth switching element (S4) is subsequently closed and the respective state of charge of storage cells (101) of the respective energy storage unit (R1, R2) is equalized within the respective energy storage unit (R1, R2) and then the fifth switching element (S5) is closed;
wherein a sixth method step (ST205) involves two seventh switching elements (108) being closed in order to connect a first pole connection (P1) of the first energy storage unit (R1) to a first input (E1) of the circuit arrangement and to connect a second pole connection (P2) of the second energy storage unit (R2) to a second input (E2) of the circuit arrangement, and, subsequently, the supply of energy from the DC voltage source connected to the first pole connection (P1) and the second pole connection (P2) to the energy storage units (R1, R2) being started;
wherein a seventh method step (ST206) involves the states of charge of the energy storage units (R1, R2) being monitored;
wherein an eighth method step (ST207) involves the charging process being terminated by opening the two seventh switching elements (108) and if need be closing the third switching element (S3) and opening the fourth and fifth switching elements (S4, S5), so that the energy storage units (R1, R2) are connected in series.

5. The charging method as claimed in claim 4, wherein
the first method step (ST200) involves the maximum charging voltage of the DC voltage source being determined,
wherein the second method step (ST201) involves the maximum charging voltage of the energy storage system (100) being determined,
wherein the fourth method step (ST203) involves the first variant, a parallel connection, being chosen if the maximum voltage of the energy storage system (100) exceeds the maximum charging voltage of the DC voltage source.

6. The charging method as claimed in claim 4,
wherein the fifth method step (ST204) is followed by a sixth switching element (S6) being closed and, in the sixth method step (ST205), the first switching element (S1) remaining open in order to connect a DC-DC voltage converter (111) to the DC voltage source.

7. An electrical energy storage system (100) having at least two electrical energy storage units (R1, R2),
wherein the electrical energy storage system (100) has a circuit arrangement as claimed in claim 1.

8. The circuit arrangement as claimed in claim 1, wherein the circuit arrangement is included in an electrically driven vehicle or in a hybrid vehicle.

9. The circuit arrangement as claimed in claim 1, further comprising a second precharging circuit configured to limit equalizing currents between the first energy storage unit (R1) and the second energy storage unit (R2),
wherein the second precharging circuit is arranged so as to be connected in parallel with the fourth switching element (S4).

10. A circuit arrangement for an electrical energy storage system (100) having a first energy storage unit (R1) and a second energy storage unit (R2), which each have a first pole connection (P1, P4) and a second pole connection (P3, P2), the circuit arrangement comprising:
at least one first input (E1) and a second input (E2) for electrically conductive connection to a DC voltage source,
at least one first output (A1) and a second output (A2) for electrically conductive connection to at least one electrical component,
a first switching element (S1), which is arranged between the first pole connection (P1) of the first energy storage unit (R1) and the first output (A1), wherein the first pole connection (P1) of the first energy storage unit (R1) is electrically conductively connected to a first connection of the first switching element (S1), and the first output (A1) is electrically conductively connected to a second connection of the first switching element (S1),
a second switching element (S2), which is arranged between the second pole connection (P2) of the second energy storage unit (R2) and the second output (A2), wherein the second pole connection (P2) of the second energy storage unit (R2) is electrically conductively connected to a first connection of the second switching element (S2), and the second output (A2) is electrically conductively connected to a second connection of the second switching element (S2),
wherein the first pole connection (P1) of the first energy storage unit (R1) is electrically conductively connectable to the first input (E1) by means of a seventh switching element (108), and the second pole connection (P2) of the second energy storage unit (R2) is electrically conductively connectable to the second input (E2) by means of a further seventh switching element (108),
wherein the second pole connection (P3) of the first energy storage unit (R1) and the first pole connection (P4) of the second energy storage unit (R2) have a third switching element (S3) arranged between them, wherein the second pole connection (P3) of the first energy storage unit (R1) is electrically conductively connected to a first connection of the third switching element (S3), and the first pole connection (P4) of the second energy storage unit (R2) is electrically conductively connected to a second connection of the third switching element (S3), wherein the second pole connection (P3) of the first energy storage unit (R1) and the second pole connection (P2) of the second energy storage unit (R2) have a fourth switching element (S4) arranged between them, wherein the second pole connection (P3) of the first energy storage unit (R1) is electrically conductively connected to a first connection of the fourth switching element (S4), and the second pole connection (P2) of the second energy storage unit (R2) is electrically conductively connected to a second connection of the fourth switching element (S4), wherein the first pole connection (P1) of the first energy storage unit (R1) and the first pole connection (P4) of the second energy storage unit (R2) have a fifth switching element (S5) arranged between them, wherein the first pole connection (P1) of the first energy storage unit (R1) is electrically conductively connected to a first connection of the fifth switching element (S5), and the first pole connection (P4) of the second energy storage unit (R2) is electrically conductively connected to a second connection of the fifth switching element (S5), wherein the energy storage units (R1, R2) are connected in parallel or in series on the basis of the switch position of the third, fourth and fifth switching elements (S3, S4, S5), wherein the circuit includes at least one precharging circuit (122) configured to limit equalizing currents between the first energy storage unit (R1) and the second energy storage unit (R2), wherein the at least one precharging circuit (122) is arranged so as to be connected in parallel with the fourth switching element (S4).

11. The circuit arrangement as claimed in claim 10, further comprising a second precharging circuit configured to limit equalizing currents between the first energy storage unit (R1) and the second energy storage unit (R2), wherein the second precharging circuit is arranged so as to be connected in parallel with the fifth switching element (S5).

* * * * *